(12) United States Patent
Lavian et al.

(10) Patent No.: US 6,842,781 B1
(45) Date of Patent: Jan. 11, 2005

(54) DOWNLOAD AND PROCESSING OF A NETWORK MANAGEMENT APPLICATION ON A NETWORK DEVICE

(75) Inventors: Tal Isaac Lavian, Sunnyvale, CA (US); Robert James Duncan, San Francisco, CA (US)

(73) Assignee: Nortel Networks Limited, Billerica, MA (US)

( * ) Notice: Subject to any disclaimer, the term of this patent is extended or adjusted under 35 U.S.C. 154(b) by 766 days.

(21) Appl. No.: 09/753,342

(22) Filed: Dec. 29, 2000

Related U.S. Application Data

(63) Continuation-in-part of application No. 09/522,332, filed on Mar. 9, 2000.

(51) Int. Cl.[7] .......................................... G06F 15/177
(52) U.S. Cl. ...................... 709/223; 709/225; 709/226; 707/102
(58) Field of Search ................................ 709/223, 224, 709/225, 226; 707/102

(56) References Cited

U.S. PATENT DOCUMENTS

| | | | |
|---|---|---|---|
| 6,195,678 B1 * | 2/2001 | Komuro ..................... 709/202 |
| 6,275,853 B1 * | 8/2001 | Beser et al. ................. 709/223 |
| 6,393,475 B1 * | 5/2002 | Leong et al. ................ 709/223 |
| 6,490,255 B1 * | 12/2002 | Kiriha et al. ................ 370/254 |
| 6,570,867 B1 * | 5/2003 | Robinson et al. ........... 370/351 |
| 6,574,662 B2 * | 6/2003 | Sugiyama et al. .......... 709/223 |
| 6,639,910 B1 * | 10/2003 | Provencher et al. ........ 370/351 |

* cited by examiner

*Primary Examiner*—Viet D. Vu
*Assistant Examiner*—Jinsong Hu
(74) *Attorney, Agent, or Firm*—Nortel Networks Limited

(57) ABSTRACT

A method and system is provided for performing a network management task on a network device. The network device loads a network management application capable of performing the network management task onto the network device in response to a request. Loading may include accessing an application server having the network management application capable of a performing the network management task and downloading the network management application over a network from the application server to the network device. The network device then executes the network management application corresponding to the requested network management task. Methods and systems provide a result from executing the network management application to a network management system used to manage the network.

15 Claims, 6 Drawing Sheets

US 6,842,781 B1

DOWNLOAD AND PROCESSING OF A NETWORK MANAGEMENT APPLICATION ON A NETWORK DEVICE

This application is a continuation-in-part and claims priority from U.S. application Ser. No. 09/522,332, entitled METHOD AND APPARATUS FOR ACCESSING NETWORK INFORMATION ON A NETWORK DEVICE, filed Mar. 9, 2000.

TECHNICAL FIELD

This invention generally relates to network management and, more particularly, to a method and apparatus for accessing network information on a network of intelligent network devices.

BACKGROUND

Computer networks are becoming increasingly complex and difficult to manage. This is driven in part by the ever-increasing variety of network devices, computers, and software being combined together to integrate large enterprise-based intranets with the Internet. Network management tools have been produced to monitor these complex combinations of hardware and software and help troubleshoot network failures when they occurred.

Traditional network management tools use a protocol called simple network management protocol (SNMP) to monitor network devices such as routers, switches, hubs, remote access devices, or even computers in a network The protocol used to interface with SNMP includes rudimentary commands to operate on data such as to "get" a variable, "set" a variable, or "test" a variable. These commands typically are deployed from a central network management server (NMS) within the network to a network device connected to the network. The network device processes one or more of these rudimentary commands and then returns the results to the NMS for further processing and analysis. In these systems, little or no processing or analysis is performed by the network devices. Instead, the NMS is saddled with the responsibility of receiving the results as well as performing the complex analyses associated with monitoring network operation and performance.

SUMMARY

In one aspect of the present invention, a method of performing network management on a network device includes receiving a request to perform a network management task on a network device, loading a network management application capable of performing the network management task onto the network device in response to the request. In one implementation, loading includes accessing an application server having the network management application capable of a performing the network management task and downloading the network management application over a network from the application server to the network device. The network device then executes the network management application corresponding to the requested network management task. Methods and systems provide a result from executing the network management application to a network management system used to manage the network. Alternatively, the methods and systems broadcast a result from executing the network management application over a network to other network devices capable of monitoring and processing the result.

The details of one or more embodiments of the invention are set forth in the accompanying drawings and the description below. Other features of the invention will be apparent from the description and drawings, and from the claims.

DESCRIPTION OF DRAWINGS

The accompanying drawings, which are incorporated in and constitute a part of this specification, illustrate an embodiment of the invention and, together with the description, serve to explain the advantages and principles of the invention.

DETAILED DESCRIPTION

Systems and methods described herein are used to distribute network management tasks to one or more network devices connected to a network. A network application distributed to each network device collects relevant network parameters from each network device and transmits the results back to a central NMS or to other network devices on the network for further analysis. Each network application can be programmed to perform a series of complex operations using an object-oriented programming language such as Java. The network application interfaces on each network device provides an application programming interface (API) compatible with the particular programming language. This API is compatible with legacy network management protocols such as simple network management protocol (SNMP) and, therefore, can be adapted to work with a wide range of legacy compatible devices.

Tools used to generate the API consistent with the present invention include a management information database (MIB) to object-oriented software compiler and a MIB map. The compiler uses existing MIB information to generate an object oriented MIB interface to the underlying MIB information collected on each network device. The compiler also generates a MIB map to determine if access to the MIB information is made directly to the storage location of the MIB database or through a network address and network management protocol associated with the network device.

Figure 1:
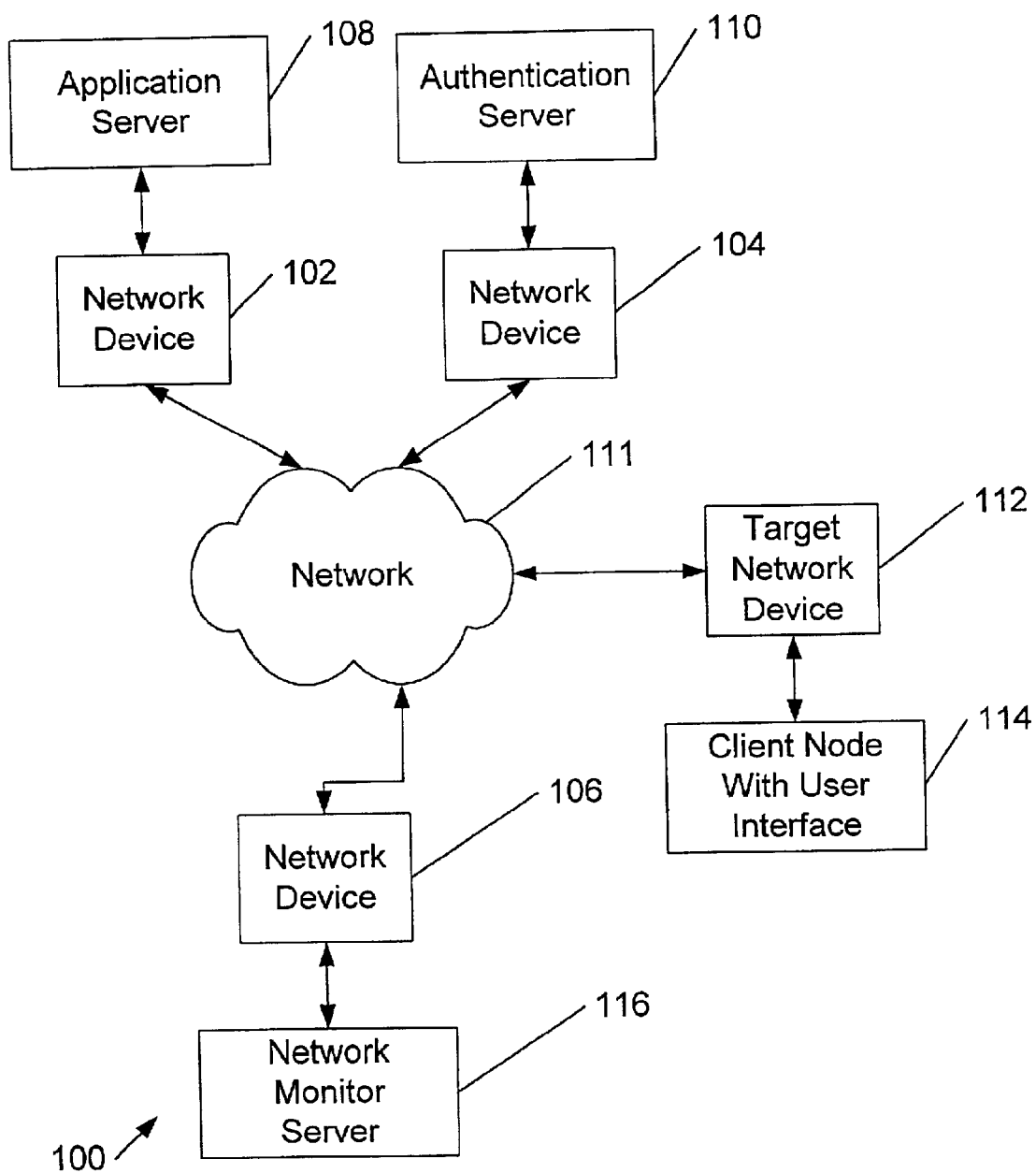
FIG. 1 is a block diagram of a network.

FIG. 1 illustrates an exemplary communication system 100 including a network device 102, a network device 104, a network device 106, and a target network device 112. Network devices 102, 104, 106, and target network device 12 may be any device capable of processing fixed-length or variable-length packets in a network, including switches, routers, hubs, computers and the like.

Network device 102 facilitates the transfer of applications from an application server 108 to the other network devices and nodes on the network. Server 108 provides applications that can execute directly on network devices 102–106 and target network device 112. The variety of network applications available for downloading from application server 108 increases the network management capabilities of each network device. For example, application server 108 may provide an application to a network device that enables the device to filter network traffic containing data packets generated from activities not critical to business, such as browsing the Internet. The resulting increase in bandwidth can be used for more critical business needs.

Network device 104 enables authentication server 110 to authenticate downloading of applications from application server 108 to other network devices within communication system 100. Authentication server 110 can identify a network device on the network and determine if that device should or should not receive a particular application. For example, authentication server 110 may authenticate a particular application and determine if the application should be downloaded to a network device in communication system 100. This feature could be used to prevent introduction of viruses or other unauthorized software onto the network. Additionally, authentication server 110 may also determine if a network device within communication system 100 has proper authorization to download an application.

Network device 106 facilitates communication between a network monitor server (NMS) 116 and other network nodes and processes within communication system 100. Traditionally, an NMS will send network commands to the network devices and, in return, receive input from the network devices, including network parameters. This traditional approach to network management requires NMS 116 to perform a majority of the processing for network management. In contrast, system 100 distributes processing to the network devices that are in communication with the network. This reduces the processing load and frees up NMS 116 so that it can process more critical tasks. For example, network device 102 may monitor network traffic between it and network 111 to reduce the processing load on NMS server 116. In such a case, NMS 116 might receive a notification from network device 102 when device 102 detects that the network bandwidth has exceeded a predetermined threshold.

Target network device 112 depicts an exemplary network device monitored by either a user or central NMS 116. The client node user interface 114 allows the user to perform network management tasks that execute directly on target network device 112. NMS 116 is used to monitor larger and more frequent management tasks dealing with groups of network devices or the overall network. For example, NMS server 116 can execute software agents on different network devices and monitor overall traffic being processed by a group of network devices connected to the network.

Figure 2:
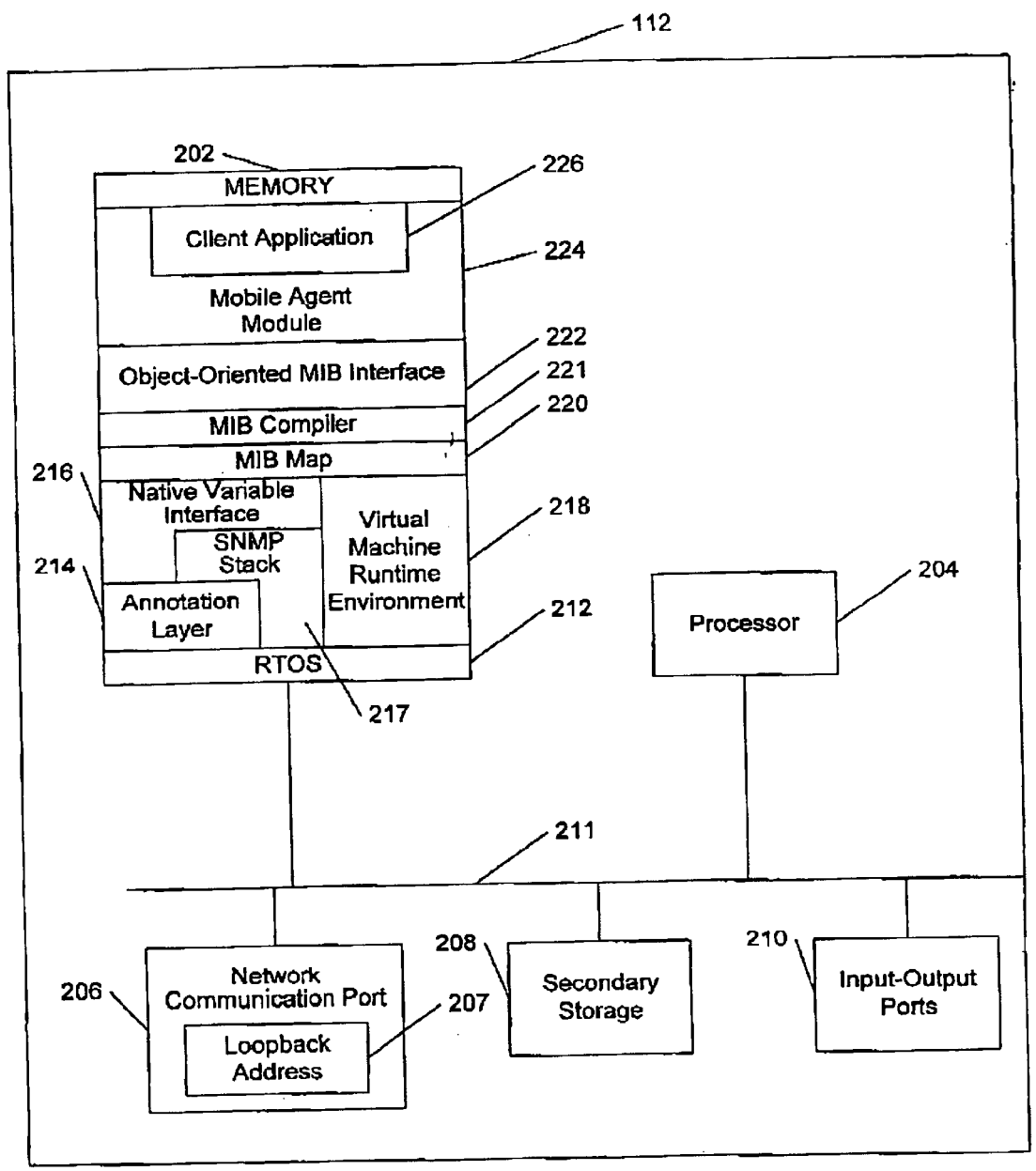
FIG. 2 is a block diagram of a network-device architecture.

FIG. 2 one architecture of the network management system used on network device 112. In this example, target network device 112 includes a memory 202, a processor 204, a network communication port 206, a secondary storage 208, and input-output ports 210 in communication with each other over a bus 211.

Network communication port 206 is compatible with a variety of physical and logical network protocols including, for example, TCP/IP and Novell NetWare. A loop back address 207 enables network management applications executing on target device 112 to access local storage areas and resources using the local network protocol stack and local network parameters rather than accessing the storage area on the network device directly. By using the network protocol stack, network applications can access network parameters on a local device and a remote device in a uniform manner. For example, a network management application executing on target network device 112 can access network parameters associated with a remote network device or a local network device through network communication port 206 by specifying either the network address of the remote network device or the local device respectively. Specifically, the network management application executing on the local device can access network parameters of the local network device by specifying loop back address 207. In effect, loop back address 207 provides indirect access to the network parameters of the local device through the network protocol stack.

Secondary storage 208 may include a disk drive, CD-ROM, or any other storage device used by target network device 112. Input-output ports 210 include physical connections for terminals, printers, pointing devices, keyboards, or any other device useful in operating target network device 112.

During execution, memory 202 includes a real time operating system (RTOS) 212, an annotation layer 214, a native variable interface 216, a simple network management protocol (SNMP)stack 217, a virtual machine runtime environment 218, a management information database (MIB) map 220, a MIB compiler 221, an object-oriented MIB interface 222, a mobile agent module 224, and a client application 226. On target network device 112, RTOS 212 provides improved performance by executing instructions as they arrive without interruption or delay. A general-purpose operating system may be used in lieu of RTOS 212 but may reduce performance of target network device 112 as processes are preempted and swapped out of memory.

Annotation layer 214 provides an interface between applications accessing the MIB database associated with a network device and the actual storage locations for the MIB database on the network device. This layer is necessary because different hardware devices tend to store the underlying MIB database information in different locations on the network device. For example, one network device may store port speed address in a central lookup table of RAM while other network devices may store the port speed addresses for each port on separate ASIC chips associated with each port. Using annotation layer 214 an application can request MIB database information without specifying the actual location of data on the network device.

SNMP stack 217 implements a network management protocol used by different networks to exchange network management information while monitoring network communication. Typically, SNMP stack 217 exchanges network information with other nodes on the network through messages called protocol data units (PDUs). The PDUs contain variables with titles and values and are generally capable of "getting" network parameters, "setting" network parameters, or "testing" for network events occurring on network devices. For example, SNMP stack 217 may transmits a PDU to a remote network device to determine if the remote device has a terminal attached to it. If the terminal is attached to the remote network device, SNMP stack 217 will receive back a PDU containing information that may identify and describe the specific terminal. Each PDU typically includes a variable title, the data-type of the variable (e.g., integer, string etc.), whether the variable is read-only or read-write, and a value of the variable.

Native variable interface 216 provides direct access to underlying SNMP data stored on a network device. Each device on the network requires a different native variable interface 216 customized to the specific features of the device hardware and software. As new network devices are produced or added to a network, a new interface 216 is customized to the specific hardware and software requirements. While this customization process increases the research and development costs, it also increases the efficiency associated with retrieving network parameters from a network device because the information is accessed directly.

Alternatively, network parameters may also be retrieved using SNMP stack 217 and loopback address 207. This eliminates the need for native variable interface 216 and reduces the corresponding costs associated with developing the native variable interface. In lieu of accessing the network parameters directly, a network management application submits requests to loopback address 207 of a network device. Within the requests are SNMP compatible commands formulated to retrieve the desired network parameters. Local processes on the network device monitoring loopback address 207 pass the request to SNMP stack 217 which, in turn, accesses the network parameters as requested. The same local processes then return the resulting network parameters back through SNMP stack 217 and through loopback address 207 and back to the network management application requesting the information.

Virtual machine runtime environment 218 processes object-oriented instructions for execution on processor 204, and may include a virtual machine (VM) and a corresponding development kit (DK)having object-oriented class libraries. The VM simulates a processor and executes on many different hardware platforms. Instructions from a variety of applications are interpreted by the VM and executed on processor 204. One virtual machine run time environment 218 includes a Java virtual machine (JVM) and the Java foundation classes. The Java virtual machine is one type of virtual machine that promotes platform independent computing using the Java programming language.

In operation, MIB map 220 facilitates converting object-oriented requests for MIB information into requests for network parameters either through SNMP stack 217 or native variable interface 216. MIB map 220 determines how network parameters in a MIB should be accessed for different types of network devices. For example, MIB map 220 can be implemented with a table that converts requests for network parameters through native variable interface 216 or SNMP stack 217 into a series of object-oriented method calls. The map includes a database listing the network parameters related to the management of a network device and a set of object-oriented methods for manipulating the network parameters. MIB map 220 maps requests for network parameters from a set of operations to access and manipulate the network parameters to a database having the actual network parameter information. Each request for a network parameter may invoke one or more object-oriented methods depending on the complexity associated with retrieving and processing the data If a new type of network device is added to the network, MIB map 220 will initially access the network parameters using SNMP stack 217 and loopback address 207 in the manner previously discussed. This allows a network management device to access network parameters on an SNMP compatible network device using existing SNMP features built into the network device. Once a native variable interface 216 is developed for the network device, MIB map 220 can be reconfigured to access network parameters through the faster and more efficient native variable interface 216.

Object-oriented MIB interface 222 provides an interface for applications to access MIB information using object-oriented classes and methods. Initially, a MIB compiler 221, discussed in further detail below, receives a list of MIB variables and generates the classes and method found in the object-oriented MIB interface 222. At least two types of variables—scalar variables and table variables—are accessible through object-oriented MIB interface 222. A scalar variable is a single variable with an identifier that identifies the variable and a value associated with the variable. If an application requests a scalar variable, object oriented MIB interface 222 returns an object-oriented instance of that scalar variable. For example, a network management application may request a scalar variable identify the number of re-sent packets on the network device. Alternatively, object-oriented MIB interface 222 may request a table of information from the underlying SNMP layer. In response, the underlying SNMP layer would provide an object table and corresponding methods for accessing each of the entries within the table. As an example, one type of object table may include a list of network addresses associated with network devices in a subnet and methods for an application to manipulate the entries in such a table.

Mobile agent module 224 provides a framework for executing a variety of mobile agents. Client application 226 represents one such mobile agent application as illustrated in FIG. 2. Accordingly, mobile agent module 224 interfaces between the mobile agent and the underlying execution environment, thus allowing a mobile agent to operate on a variety of network devices and operating environments.

For example, mobile agent module 224 implemented in accordance with the Java Bean™ application-programming interface defines a portable, platform-mutual set of APIs for software components to communicate with each other in accordance with the Java Beans conventions. In addition, mobile agents implemented using Java Bean components are able to plug into other component architectures, such as Microsoft's COM/DCOM/Active X architecture. In this capacity, mobile agent module 224 acts as a bridge between mobile agents developed using Java Beans and other component object models or component architectures. For example, mobile agent module 224 may receive Java instructions from client application 226 and convert them into instructions compatible with the COM/DCOM/Active X environment or alternatively, may convert these same Java instructions into byte codes to run on a virtual machine in virtual machine run time environment 218. It should be appreciated that client application 226 may be any type of network management application designed for execution on target network device 112.

Figure 3:
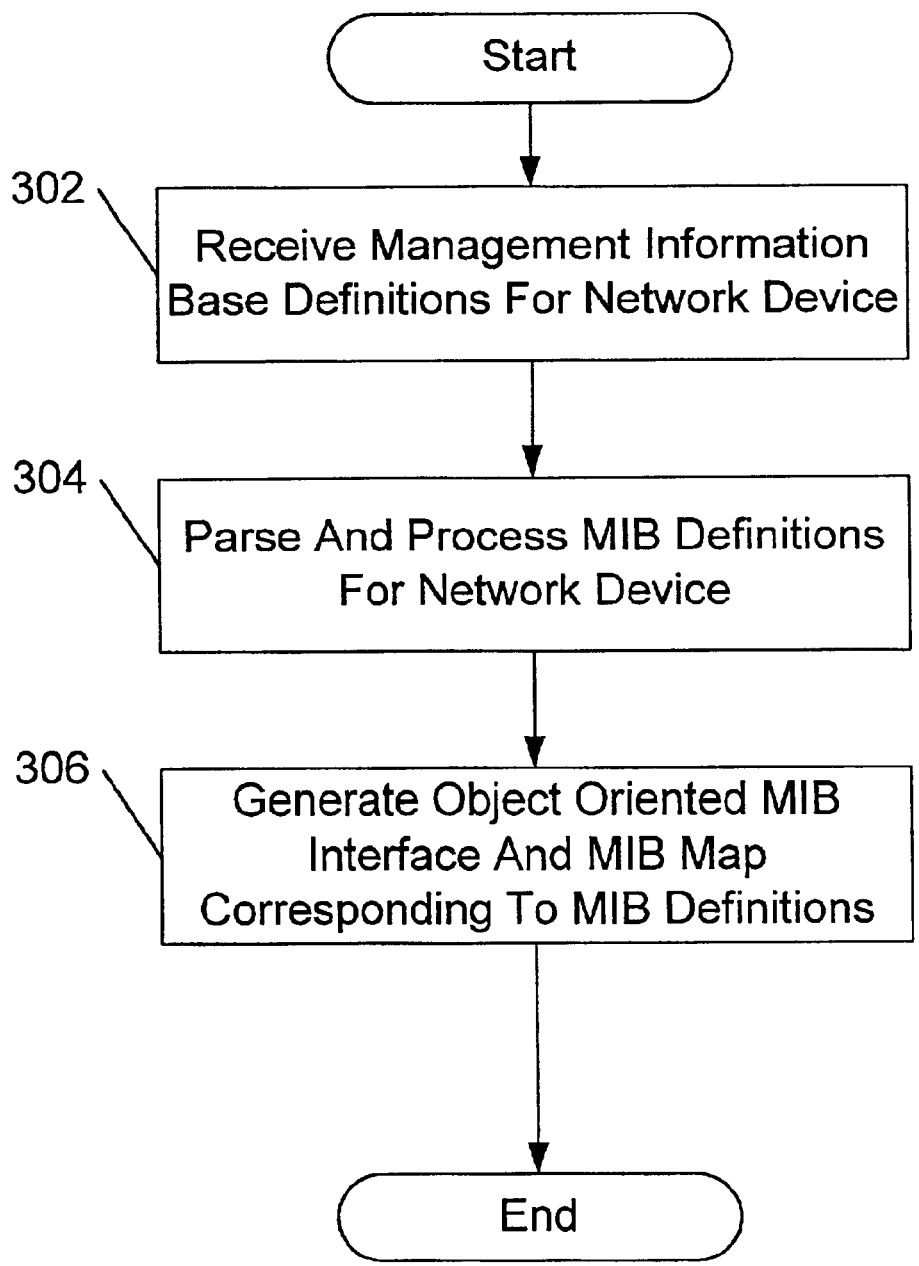
FIG. 3 illustrates the operations used to convert network parameters for a network device into an object-oriented compatible interface for accessing those network parameters.

FIG. 3 illustrates the operations for generating an interface to MIB information from an object-oriented application. MIB compiler 221 generates object-oriented MIB interface 222 and MIB map 220. Initially, MIB compiler 221 receives MIB definitions for a network device (step 302). These definitions may be stored in a database as a series of identifiers and corresponding values sufficient to describe the network parameters associated with a particular network device. Each network device may have a unique MIB definition depending on its capabilities and operating characteristics. Common MIB definitions, however, are arranged in a predetermined hierarchical order as illustrated in FIG. 4 and described below.

Next, MIB compiler 221 extracts network parameters for the specific network device from the MIB definitions (step 304). This involves lexically recognizing and parsing each token in the MIB definitions for the network device. MIB compiler 221 then generates an object-oriented MIB application programming interface or MIB interface and MIB map 220 corresponding to the MIB definitions (step 306).

The object-oriented MIB interface creates classes corresponding to the MIB hierarchy and methods for accessing each of the variables in the MIB definition. MIB map 220 assists in mapping object-oriented class definitions and method calls into corresponding combinations of SNMP primitives (e. g., get, set, and test) used by SNMP stack 217.

Figure 4:
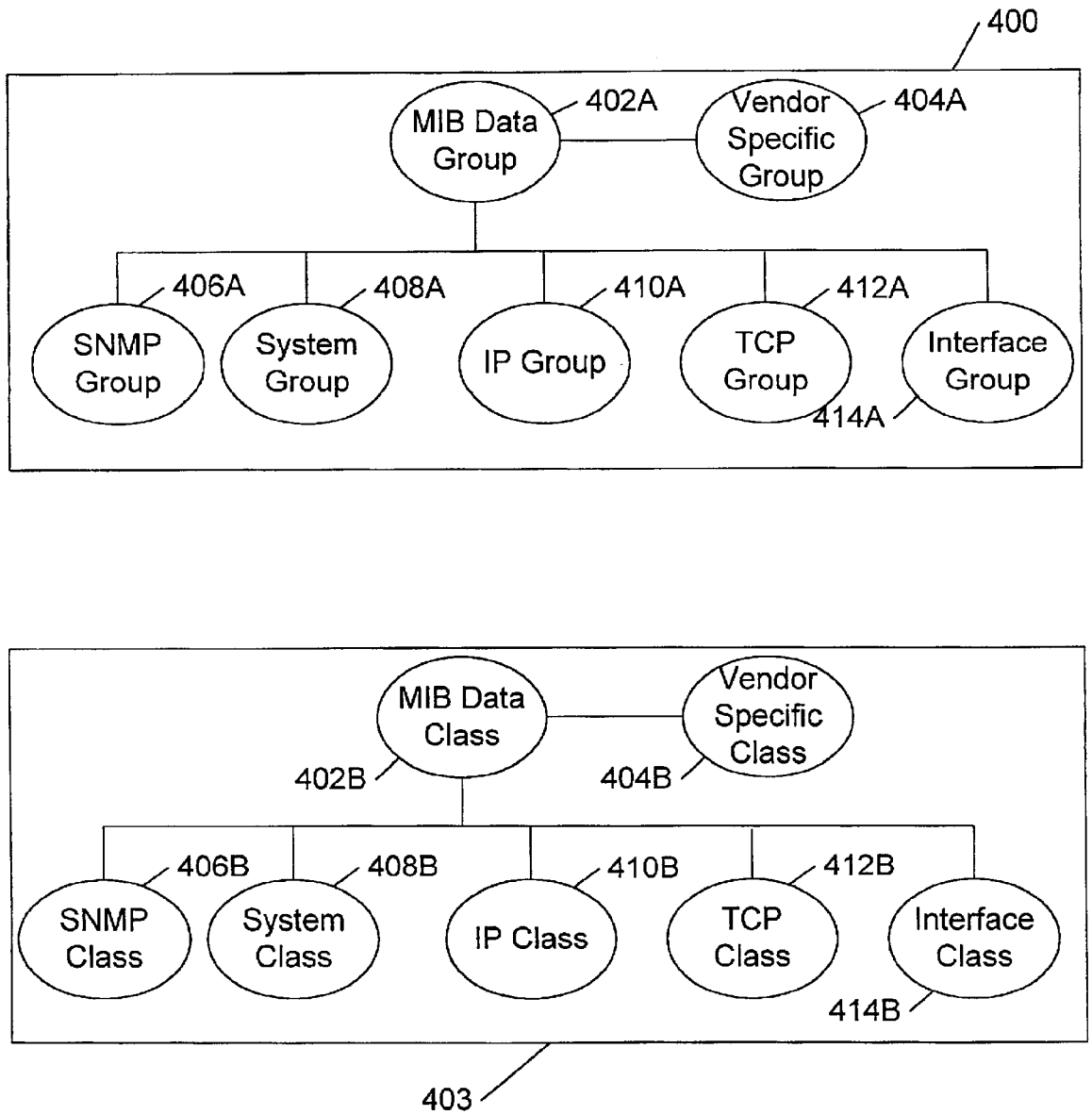
FIG. 4 depicts the relationship between a management information database (MIB) and the corresponding object-oriented MIB classes.

FIG. 4 illustrates the mapping from MIB definitions 400 to corresponding MIB classes 403 and object-oriented methods. For example, MIB definitions 400 may include a MID data group 402A, a vendor specific group 404A, an SNMP group 406A, a system group 408A, an IP group 410A, a TCP group 412A. and an interface group 414A, to name a few. These MIB information groups define how network information is organized and can be addressed on a network device. These specific groups contain network information organized according to industry standards.

For example, vendor specific group 404A includes an area that a vendor can define their own network parameters and proprietary information. SNMP group 406A includes definitions for protocol data units (PDUs) used for network nodes to communicate. IP group 410A includes information corresponding to the network communication layer. For example, IP group 410A may include the IP address of a network device and nearby routers or switches. TCP group 412A, which includes information corresponding to the transport protocol layer, may include a list of all active connections communicating using a "socket" interface as well as the ports and corresponding services.

MIB compiler 221 in FIG. 2 receives the MIB definitions 400 in FIG. 4 in a database that lists the network parameters related to the management of a network device. MIB compiler 221 converts these Mm definitions 400 into corresponding MIB objects 403 including data class 402B, vendor's specific class 404B, SNMP class 406B, system class 408B, IP class 410B, TCP class 412B, and interface class 414B. During the conversion process, MIB compiler 221 refers to MIB map 220 in FIG. 2 to determine how the methods access network parameters in the MIB database at run time. In addition, MIB compiler 221 then creates the methods an application can use to access network parameters in the MIB database corresponding to the classes.

Figure 5:
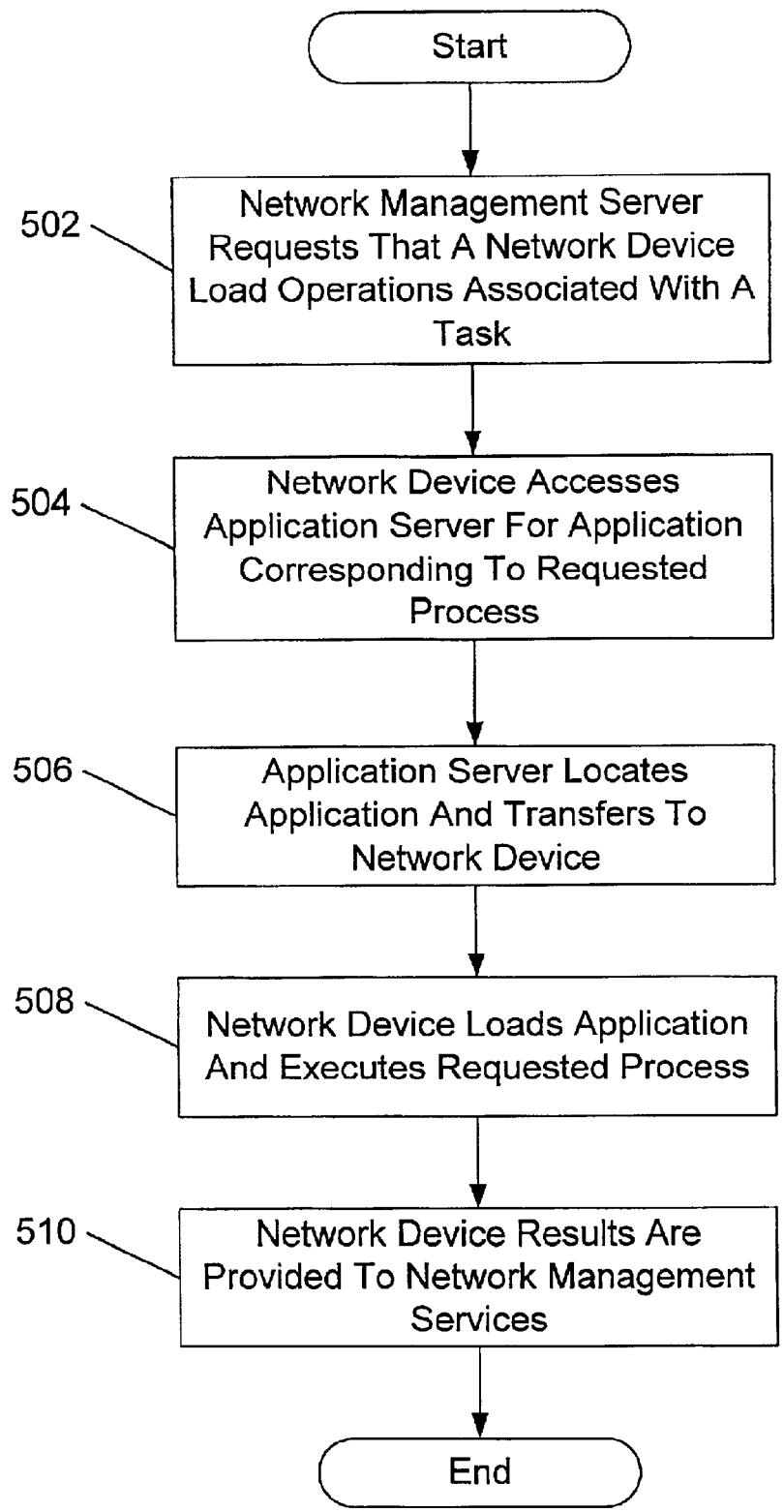
FIG. 5 illustrates the operations network management server (NMS) performs to gather network parameters from a network device.

FIG. 5 illustrates the operations used by a NMS to manage a network device. Initially, the NMS requests that a network device load a set of operations associated with a particular task (step 502). This offloads a portion of the network management processing to the target network devices and frees up the NMS to handle other requests. In addition, this reduces network traffic caused by sending numerous PDUs with SNMP messages.

In response to the request to load a set of operations, the network device accesses an application server having the application(s) capable of performing the set of operations associated with the task (step 504). For example, an application server 108 as shown in FIG. 1 stores hundreds of network applications ready for execution on target network device 112. Application server 108 receives the request, locates the application, and then transfers it to the appropriate network device (step 506). In one implementation, application server 108 transfers a network application from application server 108 to the network device each time or session the network device executes the application. Alternatively, an application may remain resident in a network device once it is initially downloaded from the application server.

The network device loads and executes the requested application (step 508). Using the application, the network device may perform a variety of network management functions. For example, the network device may be asked to monitor network traffic on a nearby network and notify the central NMS when a node on the network becomes inactive or the network traffic increases beyond a particular threshold.

Once the information or results are generated, the network device provides information back to the NMS for processing (step 510). If a central NMS is not present, the network device may broadcast results over the network to other network devices monitoring and processing the network information.

Figure 6:
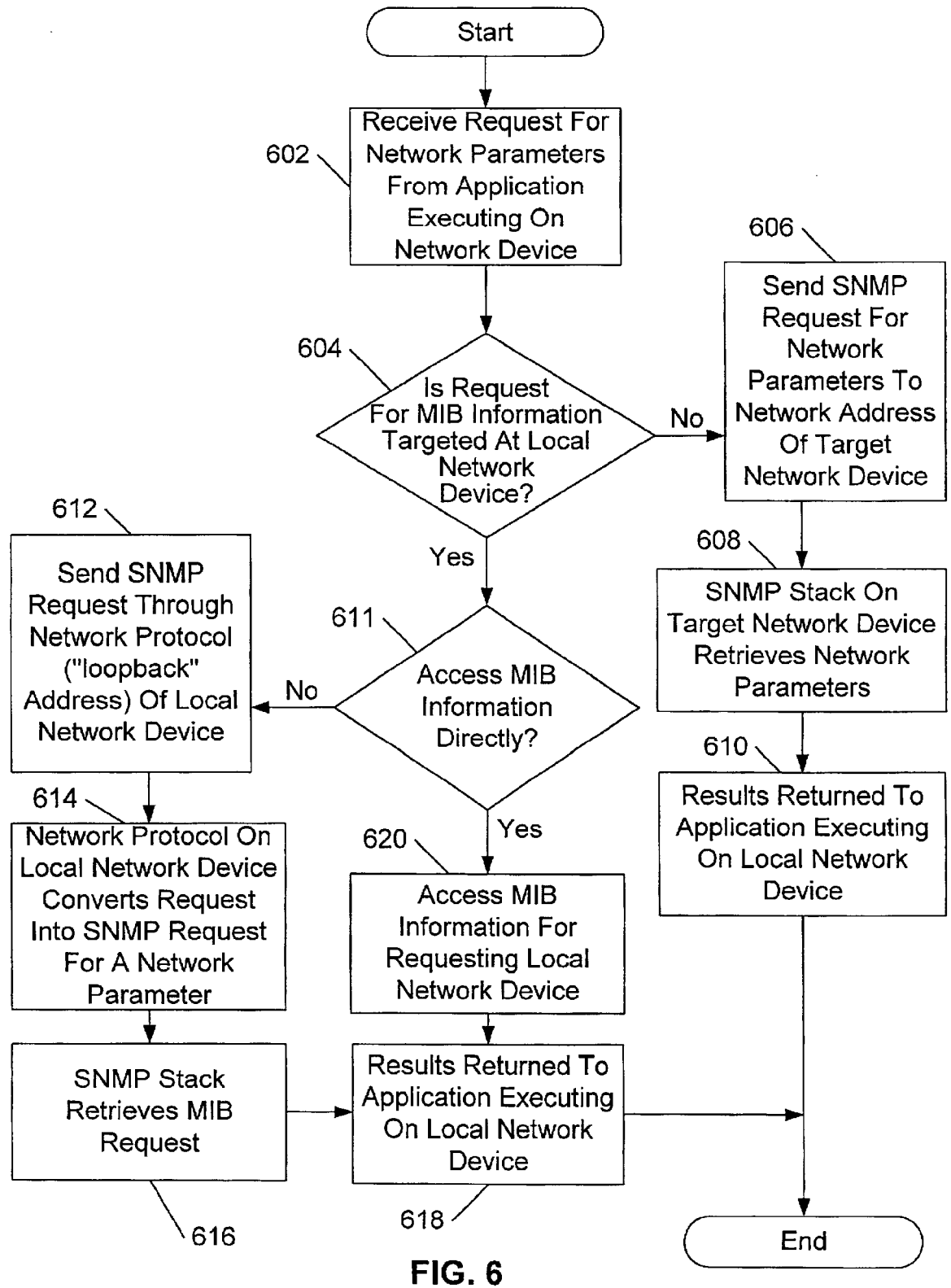
FIG. 6 illustrates the operations used by a network device to gather network parameters.

FIG. 6 illustrates the operations used to access network parameters on a network device consistent with the present invention. Specifically, a network management application executes these operations to access network parameters stored directly on a local network device or to access network parameters stored on a remote network device. By accessing network parameters on a remote device, one network device can act as a proxy for obtaining network parameters from another network device. This is particularly useful if, for example, the remote network device is an older device or otherwise incompatible with features of the present invention. For example, a network management application executing on a local network device can be used to access parameters on a remote network device designed without a virtual machine or that is not capable of executing network management applications designed consistent with the present invention. The network management application can be an object-oriented application written in Java that uses remote method invocation (RMI), JINI, COM/DCOM or other distributed computing mechanisms to process information on a remote computer system. Java, RMI, JINI and derivatives of Java are trademarks of Sun Microsystems, Inc. of Mountain View, Calif. COM/DCOM are products developed by Microsoft of Redmond, Wash.

As shown in FIG. 6, a network management application initially begins execution on a local network device. The network management application executing on the local network device requests a network parameter typically found in the MIB (step 602). For example, a network management application may request MIB information corresponding to the current count and the cumulative count of packets being transmitted to determine if the capacity of a network device has been met or exceeded.

The network management application then determines if the requested network parameter is associated with the local network device or a remote network device (step 604). If the network parameter is associated with a remote network device, the network management application forms and sends a request for the network parameter to the remote network address of the network device (step 606). For example, the network management application may request that SNMP stack 217 (see FIG. 2) create a PDU to gather MIB information on the remote device. This request can be formed using an object-oriented programming language such as Java. SNMP stack 217 then transmits the request for a network parameter over the network to the remote network device for processing. A network protocol such as TCP/IP associated with that remote network device receives the request for the network parameter. The SNMP stack on the remote device processes the request and retrieves the requested network parameter, which includes MIB information (step 608). Once the network parameter is received on a remote network device, the corresponding SNMP stack packages the result into a PDU and sends the results back to SNMP stack 217 for processing by the network application executing on a local network device (step 610).

If the network management application requests network information associated with the local network device (step 604), the network management application can access the requested network parameters in at least two different ways. The network management application can access the network parameters on the local network device directly (step 611) using a software interface customized for the network device (step 620). For example, the network management application can use a native variable interface to access network parameters on the local network device.

Alternatively, the network management application may access local network parameters on a local network device using existing network protocol. Initially, the network management application sends a request for a network parameter through the network protocol of the local network device using the "loopback" address (step 612). This loopback address is a self-referential address which identifies the local network device on the network without sending packets of information over the actual network. For example, sending a request to the loop back address establishes a data route directly back to the network protocol stack on the local network device. The network management application essentially uses SNMP stack 217 on the local network device to create a PDU to request the corresponding network parameter (step 614). SNMP stack 217 then retrieves the requests for the particular network parameter (step 616). The results, are then returned to network management application 226 executing on local network device (step 618).

While specific implementations have been described herein for purposes of illustration, various modifications may be made without departing from the spirit and scope of the invention. For example, although aspects of the present invention are described as being stored in memory and other storage mediums, they can also be stored on or read from other types of computer-readable media, such as secondary storage devices, like hard disks, floppy disks, or CD-ROM, a carrier wave from the Internet, or other forms of RAM or ROM. Accordingly, the invention is not limited to the above-described embodiments, but instead is defined by the appended claims and their full scope of equivalents.

What is claimed is:

1. A method of performing network management on a network device within a network comprising:

receiving a request to perform a network management task on a network device, the network device having a software agent previously loaded on the network device, the software agent configured to provide one or more first network parameters associated with the network device in response to one or more first network commands of a network management system (NMS) used to manage the network, the network management task requiring the network device to perform at least one of, sending one or more second network commands to one or more other network devices in the networks, receiving one or more second network parameters from the one or more other network devices in response to the one or more second network commands, or performing a network management analysis based on the received one or more second network parameters;

loading a network management application capable of performing the network management task onto the network device in response to the request, the network management application being loaded onto the network device in addition to the software agent, the network management application increasing a network management capability of the network device relative to when only the software agent was loaded on the network device, the network device being configured to any or all of sending one or more second network commands to one or more other network devices in the network, receiving one or more second network parameters from the one or more other network devices in response to the one or more second network commands, and performing a network management analysis based on the received one or more second network parameters; and executing the network management application corresponding to the requested network management task.

2. The method of claim 1 further comprising:

providing a result of the network management analysis from executing the network management application to the NMS used to manage the network.

3. The method of claim 1 further comprising:

broadcasting a result of the network management analysis from executing the network management application over the network to other network devices capable of monitoring and processing the result.

4. The method of claim 1 wherein loading a network management application further comprises:

accessing an application server having the network management application capable of a performing the network management task; and downloading the network management application over a network from the application server to the network device.

5. The method of claim 1 wherein loading a network management application further comprises:

determining if the network management application capable of performing the network management task is resident in a storage area on the network device in response to the request;

accessing an application server having the network management application capable of a performing the network management task depending on the determination; and downloading the network management application over a network from the application server to the network device depending on the determination.

6. The method of claim 1 wherein the network manage task requested includes monitoring traffic on a nearby network; and notifying the NMS when the traffic on the nearby network becomes inactive or increases beyond a particular threshold.

7. An apparatus for performing network management on a network device within a network comprising:

a receiver module configured to receive a request to perform a network management task on a network device, the network device having a software agent previously loaded on the network device, the software agent configured to provide one or more first network parameters associated with the network device in response to one or more first network commands of a network management system (NMS) used to manage the network, the network management task requiring the network device to perform at least one of, sending one or more second network commands to one or more other network devices in the networks, receiving one or more second network parameters from the one or more other network devices in response to the one or more second network commands, or performing a network management analysis based on the received one or more second network parameters;

a loader module configured to load a network management application capable of performing the network management task onto the network device in response to the request, the network management application being loaded onto the network device in addition to the software agent, the network management application increasing a network management capability of the network device relative to when only the software agent was loaded on the network device, the network device being configured to any or all of sending one or more second network commands to one or more other network device in the network, receiving one or more second network parameters from the one or more other network devices in response to the one or more second network commands, and performing a network management analysis based on the received one or more second network parameters; and an execution module configured to execute the network management application corresponding to the requested network management task.

8. The apparatus of claim 7 further comprising:
a module that provides a result of the network management analysis from executing the network management application to the NMS used to manage the network.

9. The apparatus of claim 7 further comprising:
a broadcast module configured to broadcast a result of the network management analysis from executing the network management application over the network to other network devices capable of monitoring and processing the result.

10. The apparatus of claim 7 wherein the loader module further comprises:
an access module configured to access an application server having the network management application capable of a performing the network management task; and
a download module configured to download the network management application over a network from the application server to the network deice.

11. The apparatus of claim 7 wherein the loader module further comprises:
a determination module configured to determine if the network management application capable of performing the network management task is resident in a storage area on the network device in response to the request;
an access module configured to access an application server having the network management application capable of a performing the network management task depending on the determination; and
a download module configured to download the network management application over a network from the application server to the network device depending on the determination.

12. The apparatus of claim 7 wherein the network manage task requested comprises:
module configured to monitor traffic on a nearby network; and
a notification module configured to notify the NMS when the traffic on the nearby network becomes inactive or increases beyond a particular threshold.

13. An apparatus for performing network management on a network device within a network comprising:

a processor, and
a memory containing instructions when executed cause the processor to,
receive a request to perform a network management task on a network device, the network device having a software agent previously loaded on the network device, the software agent configured to provide one or more first network parameters associated with the network device in response to one or more first network commands of a network management system (NMS) used to manage the network, the network management task requiring the network device to perform at least one of,
sending one or more second network commands to one or more other network devices in the network,
receiving one or more second network parameters from the one or more other network devices in response to the one or more second network commands,
performing a network management analysis based on the received one or more second network parameters,
load a network management application capable of performing the network management task onto the network device in response to the request, the network management application being loaded onto the network device in addition to the software agent, the network management application increasing a network management capability of the network device relative to when only the software agent was loaded on the network device, the network device being configured to any or all of sending one or more second network commands to one or more other network devices in the network, receiving one or more second network parameters from the one or more other network devices in response to the one or more second network commands, and performing a network management analysis based on the received one or more second network parameters, and
execute the network management application corresponding to the requested network management task.

14. An apparatus for performing network management on a network device within a network comprising:
means for receiving a request to perform a network management task on a network device, the network device having a software agent previously loaded on the network device, the software agent configured to provide one or more first network parameters associated with the network device in response to one or more first network commands of a network management system (NMS) used to manage the network, the network management task requiring the network device to perform at least one of,
sending one or more second network commands to one or more other network devices in the network,
receiving one or more second network parameters from in the one or more other network devices in response to the one or more second network commands, or
performing a network management analysis based on the received one or more second network parameters;
means for loading a network management application capable of performing the network management task onto the network device in response to the request, the network management application being loaded onto the network device in addition to the software agent, the network management application increasing a network management capability of the network device relative to when only the software agent was loaded on the network device, the network device being configured to any or all of sending one or more second network commands to one or more other network devices in the network receiving one or more second network parameters from the one or more other network devices in response to the one or more second network commands, and performing a network management analysis based on the received one or more second network parameters; and means for executing the network management application corresponding to the requested network management task.

15. A computer program product for performing network management on a network device within a network the product comprising program code instructions to cause a processor to:

receive a request to perform a network management task on a network device, the network device having a software agent previously loaded on the network device, the software agent configured to provide one or more first network parameters associated with the network device in response to one or more first network commands of a network management system (NMS) used to manage the network the network management task requiring the network device to perform at least one of, sending one or more second network commands to one or more other network devices in the network, receiving one or more second network parameters from the one or more other network devices in response to the one or more second network commands, or performing a network management analysis based on the received one or more second network parameters;

load a network management application capable of performing the network management task onto the network device in response to the request the network management application being loaded onto the network device in addition the software agent, the network management application increasing a network management capability of the network device relative to when only the software agent was loaded on the networks device, the network device being configured to any or all of sending one or more second network commands to one or more other network device in the network, receiving one or more second network parameters from the one or more other network devices in response to the one or more second network commands, and performing a network management analysis based on the received one or more second network parameters; and execute the network management application corresponding to the request network management task.

* * * * *